United States Patent

[11] 3,616,251

[72] Inventors Gianni Linoli
Lecco;
Enzo Sergio Mannucci, Calolziocorte, both of Italy
[21] Appl. No. 774,490
[22] Filed Nov. 8, 1968
[45] Patented Oct. 26, 1971
[73] Assignee Miles Laboratories, Inc.
Elkhart, Ind.

[54] TEST DEVICE
8 Claims, No Drawings
[52] U.S. Cl. ..................................................... 195/99,
23/230 B, 23/253 TP, 195/103.5 R
[51] Int. Cl. ..................................................... G01n 31/14,
G01n 31/22
[50] Field of Search ............................................ 195/103.5
R, 99, 103.5 C, 127; 23/253 TP, 230 B

[56] References Cited
UNITED STATES PATENTS
2,359,052   9/1944   Scharer ......................... 195/103.5
2,567,445   9/1951   Parker ........................... 195/103.5 UX

*Primary Examiner*—A. Louis Monacell
*Assistant Examiner*—James R. Hoffman
*Attorneys*—Joseph C. Schwalbach, Michael A. Kondzella and Louis E. Davidson ABSTRACT: A test device useful for the detection of a component of a fluid system comprises a water-resistant carrier, such as an organoplastic strip, containing, as an integral part thereof, a test system for the detection of such component. This test device is produced by incorporating the test system into at least a partially dissolved portion of the carrier material and then solidifying such carrier material with the test system included therein.

TEST DEVICE

BACKGROUND AND DISCUSSION OF PRIOR ART

Test devices for the detection and/or determination of various components of fluid systems have been known for many years. For the most part, these prior art test devices consisted essentially of bibulous materials, such as filter paper, impregnated with the reagent components of the test system. These prior art materials had the main disadvantage that the test system reagent components were often soluble in the fluid system being tested. This was especially true for test devices useful for measuring the pH of a fluid system. It was suggested in the prior art to form selectively permeable protective barriers on the reagent impregnated bibulous carriers by coating the carriers with a plastic coating, such as that obtained from ethyl cellulose. These prior art coated test devices had the disadvantage of requiring additional processing steps in their manufacture.

STATEMENT OF THE INVENTION

It has now been found that an improved test device can be prepared which overcomes the disadvantages of the prior art devices. In accordance with the present invention, a test device for the detection of a component of a fluid system is provided which comprises a water-resistant carrier containing, as an integral part thereof, a test system for said component. This test device is prepared by the novel process of incorporating said test system into at least a partially dissolved portion of water-resistant carrier material and solidifying said water-resistant carrier material with the test system included therein. In particular, this novel test device is preferably prepared by contacting a solidified portion of a water-resistant carrier material with a mixture of the test system and a solvent for said carrier material, whereby at least a surface portion of the solidified carrier material is at least partially dissolved to allow the test system to be mixed therein prior to resolidification of the carrier material by evaporation of the solvent.

The test devices of the present invention can be employed to detect and/or determine various components of a fluid system. Exemplary of such component is an enzyme, such as a phosphatase, which is present in a body fluid, such as serum. This enzyme may be capable of liberating a coupling compound, such as beta-naphthol, from a substrate, such as beta-naphthylphosphate. This liberated coupling compound may then form a reaction product with a chromogen. The intensity of the resulting color is dependent on the concentration of the coupling compound and thus is an indication of the amount of the specific enzyme in the test sample. THe test device for an enzyme can contain, incorporated in the water-resistant carrier, a mixture of the substrate and the chromogen. Alternatively, the substrate can be in a separate composition which is used first to react with an enzyme-containing sample and then a test device containing a chromogen is contacted with the resulting coupling compound-containing reaction mixture. The following is a list of representative enzymes that can be measured by test devices of the present invention.

| Enzyme | Substrate | Liberated Coupling Compound |
|---|---|---|
| Phosphatase | naphthyl-phosphate | Beta-naphthol |
| Phosphatase | Alpha-naphthyl-phosphate | Alpha-naphthol |
| Lipase | Beta-naphthyl-laurate | Beta-naphthol |
| Glutamic oxalo-acetic transaminase | Sodium aspartate-alpha-ketoglutarate | Oxaloacetic acid |
| Leucine amino-peptidase | Alpha-leucine-beta-naphthylamine | Beta-naphthyl-amine |
| Esterase | Naphthyl esters | Naphthol |
| N-acetylbeta-glucosaminidase | Naphthyl-beta-acetyl glucosamine | Naphthol |
| Oxytocinase | Cysteine-meta-anisidide | Meta-anisidine |

A test device of the present invention containing an appropriate chromogen can also be used to detect and determine other compounds directly, such as bilirubin and pyruvic acid, without requiring prior reaction with a substrate.

Chromogens which can be employed to react with the above compounds to form colored reaction products are the well-known diazonium salts of dyes, such as the water-soluble commercial fast color salts. Illustrative examples are the diazonium salts of 6-benzamido-4-methoxy-m-toluidine (fast violet B, color index 37165), 5-nitro-2-aminoanisole-zinc chloride (fast red B, color index 37125), 4'-amino-2',5'-diethoxybenzanilide (fast blue BB, color index 37175), 4-benzoyl-amino-2,5-dimethoxyaniline (fast blue RR, color index 37155) and the like. Even though these chromogens are water soluble, they do not leach out of the test devices of the present invention. The selectively permeable nature of the carrier material allows the test fluid to pass into the test device but prevents the chromogen or the reacted color compound from passing out.

The preferred chromogen in the test devices for detection and/or determination of enzymes is an insoluble polymeric diazonium salt of an aromatic polyamine bound through an amide linkage to a cation exchange resin. This chromogen is prepared by reacting a cation exchange resin which contains acid groups, such as carboxylic groups, with a halogenating agent, such as thionyl chloride, to convert at least some of the acid groups of the resin to acyl halide groups. The resulting acyl halide groups are then reacted with an aromatic polyamine, such as o-dianisidine, to provide a resin containing amide linkages and free aromatic amino groups. This product is then treated by well-known techniques to diazotize the free aromatic amino groups to produce the insoluble polymeric diazonium salt. This product is insoluble in both aqueous and nonaqueous systems.

The test devices of the present invention can also be used to measure the pH of a fluid system. In these cases the test system includes a pH-sensitive material as the chromogen. It is preferred that the pH indicator material itself be insoluble. The insoluble pH indicator can consist of the reaction product of an insoluble polymeric material and a pH-sensitive compound. Such insoluble indicators can be prepared in various ways. An insoluble polymeric diazonium salt of an aromatic polyamine bound through an amide linkage to a cation exchange resin, described above, can be reacted with a suitable coupling compound, such as N,N-dimethyl aniline. The resulting reaction product undergoes color changes at various pH values depending on the specific polyamine employed in the polymeric diazonium salt.

Another form of pH indicator can be prepared by reacting a well-known diazonium salt of para-aminobenzyl cellulose with a suitable coupling compound, such as alpha-naphthylamine. The resulting reaction product undergoes a color change from violet to orange-red in the pH range from 4 to 6.

Still another form of pH indicator can be prepared by reacting a soluble compound having at least one free amino or phenolic group, such as rosaniline, with a polycarboxylic resin acyl halide. This polycarboxylic resin acyl halide can be prepared by reacting a cation exchange resin containing carboxylic acid groups with a halogenating agent, such as thionyl chloride. THe resulting reaction product undergoes a color change when changing from acidic to alkaline conditions.

Still a further form of pH indicator can be prepared by reacting a suitable diazonium salt, such as the diazonium salt of 6-benzamido-4-methoxy-m-toluidine (fast violet B, color index 37165) with the reaction product of a polycarboxylic resin acyl halide and a suitable aromatic compound having at least one free amino group, such as N-(1-naphthyl)ethylene diamine.

The test devices of the present invention can also contain test systems for other components, such as urea in blood. In this form of the invention the test system comprises a urease enzyme which catalyzes the hydrolysis of urea to liberate ammonia, a suitable buffer and a pH indicator which changes color from yellow to blue in the pH range of 5–8. A suitable pH indicator is the reaction product of an ion exchange resin having free amino groups and dibromothymolsulfonphthalein (bromthymol blue). Other pH indicators useful in a teat for urea which change color from yellow to red in the pH range of 6–8 are the reaction products of an ion exchange resin having free amino groups and o-cresolsulfonphthalein (cresol red) or phenolsulfonphthalein (phenol red) or m-cresolsulfonphthalein (metacresol purple).

THe water-resistant carrier employed in the present invention to contain the test system is preferably a colorless transparent organoplastic material which is at least partially soluble or is able to swell in an appropriate solvent. When a transparent parent carrier is employed, the resulting test device forms a reasonably transparent test area containing the chromogen. The colors developed by the chromogen in the test area can then be read visually or instrumentally under reflected or transmitted light conditions. This is an advantage of the improved test device of the present invention as compared to most prior art devices which can be read only under reflected light conditions. In one form of the invention a mixture of carrier material, solvent and test system is cast as a film and allowed to solidify by evaporation of solvent. The resulting film can be self-supporting or it can be bonded to a suitable supporting member. In a preferred form of the invention the carrier material in solidified form is contacted with a liquid mixture of solvent and test system. The solvent allows the test system to penetrate into at least a surface portion of the carrier. The solvent is then evaporated. The following are illustrative examples of suitable water-resistant carrier materials and appropriate solvents for use therewith.

| Carrier Material | Solvent |
| --- | --- |
| Celluloid | Acetone |
| | Methylethylketone |
| Cellulose acetate | Acetone |
| | Acetone-methylethylketone mixture |
| Ethyl cellulose | |
| | Benzene |
| Polymethylmethacrylate | Chloroform |
| | Carbon tetrachloride |
| Polystyrene | Benzene |
| | Toluene |
| Cellulose nitrate | Acetone |
| Polyvinyl chloride | Acetone |
| Polyethylene | Benzene |

If desired, various fillers, such as cellulose, barium sulfate, alumina and the like can be included in the test device to add bulk to the test system and to aid in color definition. These fillers tend to increase the opacity of the test area of the test device.

The invention will be described in further detail in the following examples.

EXAMPLE 1

A polymethocrylic cation exchange resin in the acid form having carboxylic acid reactive groups. (Amberlite IRP 64) was milled into a fine powder having a particle size range from 20 to 50 microns and dried. A 50 g. portion of this powder was refluxed in 200 ml. of thionyl chloride under stirring for 6 hours. The reaction mixture was then filtered and the resulting chlorinated resin was washed with anhydrous toluene and dried under vacuum. A 10 g. portion of this chlorinated resin was poured into a solution of 3.3 g. of o-dianisidine in 75 ml. of dry toluene. The resulting suspension was heated at 85° C. for 5 hours with stirring. The reaction mixture was filtered and the resin was washed with 100 ml. of ethanol from which it was possible to recover the unreacted amine. The resin was then placed into a chromatographic column and washed with 200 ml. of 2N $HBF_4$ and then with water. A 3 g. quantity of the thus-prepared resin-acylated amine was suspended in 10 ml. of 3N $HBF_4$ and cooled to a temperature of 0°–5° C. The resulting suspension was stirred while adding dropwise 10 ml. of 1N $NaNO_2$. Stirring was continued and the temperature maintained for 4 hours. The mixture was then centrifuged and the isolated product was dried in a vacuum. This product had the formula of Resin—CO—NA—Ar—$N^+$ N—$BF_4$, wherein "Resin" represents the cation exchange resin and "Ar" represents the dianisidine nucleus. This product is an insoluble polymeric diazonium salt of an aromatic polyamine bound through an amide linkage to a cation exchange resin. This product was further milled to a fine powder having particle sizes in the range of 1–5 microns.

A mixture of 0.2 g. of the above product, 0.015 g. cellulose acetate, 2 ml. acetone and 2 ml. methylethylketone was homogenized. A 0.2 mm. thick strip of celluloid, 5 mm. wide and 66 mm. long, was treated with a portion of the above liquid mixture, then dried in air and under vacuum. The resulting strip product consisted of a water-resistant celluloid organoplastic carrier containing, as an integral part thereof, the above insoluble polymeric diazonium salt of an aromatic polyamine bound through an amide linkage to a cation exchange resin. This chromogen is capable of forming colored reaction products with various coupling compounds and thus acting as a test system.

The above-prepared test device had a yellow color in the area containing the chromogen. When this test device was placed in an aqueous alkaline solution containing 350 micrograms of beta-naphthol per ml. of solution, the test device turned to a red-violet color indicating reaction between the beta-naphthol and the chromogen.

EXAMPLE 2

The procedure of example 1 was repeated several times using as the aromatic polyamine benzidine, o-tolidine, 4,4'-diaminodiphenylamine, m-phenylenediamine, 1,8-diaminoaphthalene, 2-Cl-1,4-diaminobenzene, 2-$NO_2$-1,4-diaminobenzene, and 2-$SO_3H$-1,4-diaminobenzene to form different chromogens. These chromogens were then employed individually in the cellulose acetate, acetone, methylethylketone mixture of example 1 to treat celluloid strips in the manner described in example 1. The resulting test devices were then placed in aqueous alkaline solutions containing 350 micrograms of beta-naphthol per ml. of solution and color changes were noted. The following table shows the color changes indicating reaction between the beta-naphthol and the chromogen contained within the celluloid carrier.

| Amine Constituent of Color Developer | Test Device Initial Color | Test Device Final Color |
| --- | --- | --- |
| Benzidine | Yellow | Red |
| o-tolidine | Yellow | Violet |
| 4,4'-diaminodiphenylamine | Green | Brown |
| m-phenylenediamine | Yellow | Orange-Red |
| 1,8-diaminonaphthalene | Orange | Red-Brown |
| 2-Cl-1,4-diaminobenzene | White | Red |
| 2-$NO_2$-1,4-diaminobenzene | Yellow | Red |
| 2-$SO_3H$-1,4-diaminobenzene | White | Red |

The above examples all employed water-insoluble chromogens. The following example describes use of a water-soluble test system contained in a water-resistant carrier.

EXAMPLE 3

A mixture of 0.025 g. of the diazonium salt of 6-benzamido-4-methoxy-m-toluidine (fast violet B, color index 37165), 0.020 g. cellulose acetate, 0.008 g. $HBF_4$, 4 ml. acetone and 0.010 g. $TiO_2$ was homogenized. A 0.2 mm. thick strip of celluloid, 5 mm. wide and 60 mm. long, was treated with a portion of the above liquid mixture, then dried in air and under vacuum. The resulting test device product containing the diazonium salt within the celluloid carrier was then placed in an aqueous alkaline solution containing up to 500 micrograms of beta-naphthol per ml. of solution. The strip color changed from violet to red-violet indicating reaction between the diazonium salt and the beta-naphthol. The water-soluble diazonium salt did not leach out of the celluloid strip indicating that it was embedded within the celluloid.

EXAMPLE 4

The procedure of example 3 was repeated using different water-soluble diazonium salts. The resulting celluloid strips containing the diazonium salts where then immersed in aqueous alkaline solutions of beta-naphthol and color changes were observed. The water-soluble salts did not leach out of the celluloid. The following table shows the color changes for the diazonium salts employed.

| Diazonium Salt of | Original Color | Final Color |
| --- | --- | --- |
| 5-nitro-2-aminoanisole-ZnCl$_2$ (Fast Red B, Color Index 37125) | Red | Bright red |
| 4'-amino-2', 5'-diethoxybenzanilide (Fast Blue BB, Color Index 37175) | Blue | Red-violet |
| 4-benzoyl-amino-2,5-dimethoxy-aniline (Fast Blue RR, Color Index 37155) | Blue | Red-violet |

The test devices prepared in examples 1-4 are useful to qualitatively detect and/or quantitatively determine beta-naphthol. The amount of color change in the chromogen is directly related to the amount of beta-naphthol present in the test sample. This reaction can also be used to detect and/or measure phosphatase enzymes. If a test sample containing a phosphatase is treated with a suitable buffer and a beta-naphthyl phosphate, the enzyme will liberate beta-naphthol which can then be detected and measured by the above test devices. It is also possible to include the buffer and the beta-naphthyl phosphate in the test device so that the phosphatase analysis can be simplified. This is described in the following example.

EXAMPLE 5

The procedure of example 1 was repeated employing 20 mg. of beta-naphthyl phosphate in the liquid mixture used to treat the celluloid strip. Only one side of the celluloid strip was treated with this mixture for a length of 5 mm. The other side of the strip was masked by an adhesive band which was removed after the strip had been dried. A strip of filter paper 5 mm. wide was then immersed in a 50 weight percent aqueous solution of tris (hydroxymethyl) aminomethane buffer and dried. It was then cut into segments 5 mm. long. One such segment was attached by adhesive to the side of the above celluloid strip which had previously been masked. The resulting test device having a 5 mm.×5 mm. test area was then immersed in a 0.5 ml. test sample of serum containing a known amount of alkaline phosphatase for 5 minutes at 37° C. The tris (hydroxymethyl) aminomethane buffer was leached out of the filter paper by the serum and provided a sample pH of 10-12. These alkaline conditions are necessary for detection of an alkaline phosphatase. The alkaline phosphatase in the serum entered the test device and reacted with the beta-naphthyl phosphate. The beta-naphthol liberated from the beta-naphthyl phosphate by the alkaline phosphatase then caused a color change in the test device chromogen contained within the celluloid strip. The resulting color was compared to a color chart having a correlation between color and alkaline phosphatase concentration to determine the alkaline phosphatase content of the test sample. The alkaline phosphatase content thus determined corresponded to the known amount of alkaline phosphatase in the serum.

EXAMPLE 6

The procedure of example 5 was repeated employing a filter paper segment impregnated with an aqueous solution of sodium citrate instead of the tris (hydroxymethyl) aminomethane. The resulting test device was then immersed in a 0.5 ml. test sample of serum containing a known amount of acid phosphatase for 10 minutes at 37° C. The sodium citrate buffer provided a sample pH of 4.5. The beta-naphthol liberated by the acid phosphatase then caused a color change in the test device which was compared to an acid phosphatase color chart to determine the acid phosphatase content of the test sample. The acid phosphatase content thus determined corresponded to the known amount of acid phosphatase in the serum.

Example 7

A mixture of 200 mg. of a chromogen consisting of diazotized o-dianisidine linked by amidic coupling to a carboxylic cation exchange resin prepared by the method of example 1, 40 mg. of ethyl cellulose, 100 mg. of barium sulfate, 2 ml. of benzene and 2 ml. of acetone was thoroughly agitated. A strip of polystyrene 0.2 in. wide, 3 in. long and 0.2 mm. thick was dipped into the above mixture for 5 seconds and then dried at room temperature. The above mixture components were incorporated in a plastic matrix since they appeared to be covered by a plastic film. This reagent strip was then immersed in a saturated alkaline solution of beta-naphthol for 10 minutes during which time a light brown color developed in the strip indicating reaction between the chromogen and the beta-naphthol.

EXAMPLE 8

Strips of cellulose nitrate and cellulose acetate were dipped in the above-described mixture of example 7 for 3 seconds and dried at room temperature. The mixture components appeared to be incorporated in the strips. These strips were then immersed in a saturated alkaline solution of beta-naphthol and a red-brown color developed indicating reaction between the chromogen and the beta-naphthol.

EXAMPLE 9

A paper strip was dipped in a benzene suspension of polyethylene for a few seconds and then cured in a 105° C. oven for 30 minutes. The resulting polyethylene-coated paper strip was then dipped in the above-described mixture of example 7 for 10 seconds and dried at room temperature. The chromogen mixture appeared to form a coating along the strip and to be partially embedded in the polyethylene. This reagent strip then produced a positive color reaction when contracted with an alkaline beta-naphthol solution.

EXAMPLE 10

A mixture of 200 mg. of mg. chromogen of example 7, 200 mg. of barium sulfate, 40 mg. of cellulose acetate, and 4 ml. of acetone was thoroughly agitated. A strip of polyvinylchloride was dipped into the above mixture and then dried at room temperature. This reagent strip containing a chromogen incorporated in a plastic matrix produced a positive color reaction when contacted with an alkaline beta-naphthol solution.

The above examples all formed the test device by treating the water-resistant carrier member with a solvent-containing chromogen mixture wherein the solvent acts on the carrier to partially dissolve at least a surface layer of the carrier to allow the chromogen to become embedded in the carrier. The following example describes the formation of test devices having a water-resistant carrier containing a chromogen wherein the carrier forms a film adherent to a base member of different composition.

EXAMPLE 11

A 200 mg. portion of the chromogen described in example 7 was mixed with a 1 percent (weight/volume basis) solution of cellulose acetate in acetone to form a total volume of 3.5 ml. The following base materials were dipped in the above mixture: filter paper, wood, aluminum foil, glass, stainless steel, and polytetrafluoroethylene. The so-treated materials were then dried at room temperature. A water-resistant cellulose acetate coating containing the chromogen was formed on the surface of each of the above materials. These coated base materials were then contacted with an alkaline solution of beta-naphthol and they all developed red colors within 60 seconds indicating reaction between the chromogen and the beta-naphthol.

The above examples all related to the detection of beta-naphthol and especially the detection and/or determination of beta-naphthol liberated from beta-naphthyl phosphate by the action of alkaline phosphatase or acid phosphatase. The test devices of the present invention can also be used for the detection and/or determination of other substances as described in the following examples.

EXAMPLE 12

A 30 mg. portion of the diazonium salt of 5-nitro-2-aminotoluene (fast red RL, color index 37100) chromogen was dissolved in a mixture of 2 ml. acetone and 10 mg. cellulose acetate. A strip of celluloid was treated with this solution and dried in air and then under vacuum. The resulting test device had a water-resistant film containing the chromogen and had a yellow color in the chromogen area. This test device was then immersed in an aqueous alkaline solution containing 500 micrograms of alpha-naphthol per ml. of solution. This solution also contained 1.5 M tris (hydroxymethyl) aminomethane buffer. The reactive portion of the test device turned an orange color indicating reaction with the alpha-naphthol.

EXAMPLE 13

A celluloid test device containing the insoluble polymeric diazonium salt of 2-Cl-1,4-diaminobenzene bound through an amide linkage to a cation exchange resin was prepared by the technique described in example 2. This test device has a white color in the reactive zone. A 0.1 ml. portion of an aqueous solution of 0.2 M sodium aspartate, 0.1 M alpha-ketoglutarate and 0.1 M phosphate buffer at pH 7.4 was placed in a test tube. To this was added 0.2 ml. of a test serum containing glutamic oxaloacetic transaminase. This mixture was maintained at 37° C. for 20–30 minutes. The above test device was then immersed in the reaction solution for 2 minutes. The reactive zone of the test device turned orange-red indicating reaction between the chromogen in the test device and the oxaloacetic acid liberated by the transaminase from the alpha-ketoglutarate-sodium aspartate substrate.

EXAMPLE 14

A celluloid test device containing the insoluble polymeric diazonium salt of 2-NO$_2$-1,4bound through an amide linkage to a cation exchange resin was prepared by the technique described in example 2. A 0.5 ml. portion of an aqueous solution of 6.85 ×10$^{14}$ M alpha-leucine-beta-naphthylamine hydrochloride substrate and 0.2 M phosphate buffer at pH 7 was placed in a test tube. To this was added 0.05 ml. of a test serum containing leucine aminopeptidase. This mixture was maintained at 37° C. for one hour. The above test device was then immersed in the reaction solution for 5 minutes. The reactive zone of the test device turned red-violet indicating reaction between the chromogen and the beta-naphthylamine liberated by the enzyme in the serum from the substrate.

EXAMPLE 15

A celluloid test device of the type described in example 1 having a yellow reactive zone was employed in this example. A 1 ml. portion of an aqueous solution of 0.2 mg. beta-naphthyl-laurate substrate per ml. of solution, 0.1 M tris (hydroxymethyl)-aminomethane buffer and 20 weight percent sodium cholate was placed in a test tube. To this was added 0.1 ml. of a test serum having lipase activity. This mixture was maintained at 37° C. for 30 minutes. The above test device was then immersed in the reaction solution for 5 minutes. The reactive zone of the test device turned red-violet indicating reaction between the chromogen and the beta-naphthol liberated from the substrate by the lipase.

EXAMPLE 16

A cellulose acetate strip was placed in a cupric chloride-acetone solution for a few minutes. The so-treated strip was then removed from the solution, and the acetone was allowed to evaporate. The strip was then placed in a neocuproine-acetone solution for a few minutes and removed. After the acetone evaporated, a smooth green colored strip resulted which reacted quantitatively with various levels of ascorbic acid to change the color of the strip to various shades of amber-orange corresponding to the amount of ascorbic acid present.

The above examples describe the use of a test system incorporated in a water-resistant carrier to react with an active ingredient of a test fluid in order to detect or determine some component of the fluid system. The present invention also includes test devices useful for measurement of pH wherein the component or characteristic of the fluid system being detected or determined is the hydrogen ion concentration or pH. This is described in the following examples.

EXAMPLE 17

An insoluble polymeric diazonium salt of benzidine bound through an amide linkage to a carboxylic cation exchange resin was prepared in accordance with the techniques of examples 1 and 2. A 5 g. portion of this product was then suspended in 20 ml. of a buffer at pH 5 consisting of a mixture of tris (hydroxymethyl) aminomethane and 2 M acetic acid. To this suspension at 20° C. was added with stirring a 50 percent stoichiometric excess of N,N-dimethylaniline. The stirring was continued for 20 minutes to form an insoluble indicator which is the reaction product between the above diazonium salt and the N,N-dimethyl-aniline coupling compound. This indicator was then recovered by filtration, washed with water and dried. A mixture was then prepared consisting of 400 mg. of the above-prepared indicator, 400 mg. cellulose powder, 80 mg. ethylcellulose, 2 ml. benzene and 2 ml. acetone. A celluloid strip was immersed in the above liquid mixture and then dried. The resulting product was a celluloid strip containing the above indicator within the strip. When placed in an aqueous medium having a pH of 1, the test strip had a violet color. When placed in an aqueous medium having a pH of 2, the test strip had a yellow color. This color change is reversible when the medium pH being measured varies through this range.

EXAMPLE 18

Insoluble polymeric diazonium salts of aromatic polyamines bound through an amide linkage to a carboxylic cation exchange resin were prepared using several different aromatic polyamines according to the technique of example 1. These diazonium salts were then reacted with various coupling compounds according to the technique of example 17 to form insoluble indicators. These indicators were then incorporated into celluloid strips according to the technique of example 17. The resulting indicator test devices were then employed to detect pH changes. The following are the characteristics of the test devices so produced:

| Aromatic Polyamine | Coupling Compound | pH | Color |
|---|---|---|---|
| m-phenylenediamine | N,N-dimethylaniline | 1 | Red |
| | | 2 | Yellow |
| 1,4-diamino-6-benzene-sulfonic acid | N,N-dimethylaniline | 3 | Red |
| | | 4 | Yellow |
| 2-chloro-1,4-phenylene-diamine | N,N-dimethylaniline | 1 | Violet |
| | | 2 | Yellow |
| 2-chloro-1,4-phenylene-diamine | 8-hydroxyquinoline | 12 | Brown |
| | | 13 | Purple |

EXAMPLE 19

Powdered cellulose was thoroughly washed with dilute acid, dilute alkali, and water, and then dried. A 4 g. portion of this material was then mixed with 12 g. of p-nitrobenzylchloride and 30 ml. of 40 weight percent aqueous sodium hydroxide and stirred vigorously at 95° C. The reacting mixture was cooled during the first part of the exothermic reaction. After 4 hours the mixture was poured into a large excess of cold water and filtered. The residue was then washed with water, with ethanol and finally with acetone. A 5 g. portion of the above-prepared p-nitrobenzylcellulose was suspended in 50 ml. of ethanol and heated to near boiling. The mixture was then stirred vigorously and 5 g. of sodium hydrosulfite dissolved in water was slowly added. After continued heating of the mixture for about 30 min., the light yellow product was filtered off and washed with cold water. A 5 g. portion of the above-prepared p-aminobenzylcellulose was suspended in 10 ml. of 2 N hydrochloric acid, was then mixed with 20 ml. of water and chilled in an ice bath. With constant stirring, 0.5 M sodium nitrite solution was slowly added until a test with potassium iodide-starch paper remained positive for 15 min. after addition of the last portion of nitrite. Stirring was then continued for another 15 minutes., and the material was filtered and washed with weakly acid ice water. This product is the diazonium salt of p-aminobenzylcellulose. This diazonium salt was then reacted with various coupling agents according to the technique of example 17 to form insoluble indicators. These indicators were then incorporated into celluloid strips by treating the celluloid with a mixture of 800 mg. of the indicator, 80 mg. of ethyl cellulose, 2 ml. benzene and 2 ml. acetone. The resulting indicator test devices were then employed to detect pH changes. The following are the characteristics of the test devices so produced:

| Coupling Compound | pH | Color |
|---|---|---|
| N-(1-naphthyl)ethylenediamine | 2-3 | Violet |
| | 3-4 | Orange-red |
| Alpha-naphthylamine | 4-5 | Violet |
| | 5-6 | Orange-red |
| 1,8-diaminonaphthalene | 5 | Green-blue |
| | 6 | Violet-red |
| 8-hydroxyquinoline | 12 | Yellow |
| | 13 | Red |

EXAMPLE 20

A 5 g. portion of a polycarboxylic resin acyl chloride prepared in accordance with the technique of example 1 was added with stirring to an 80° C. toluene solution of basic rosaniline. A 10 ml. amount of triethylamine was then added dropwise and the stirring and heating were continued for 3 hours. The resulting product was then filtered and washed. This is an insoluble indicator represented by the reaction product of the resin acyl chloride and rosaniline. This indicator was then incorporated into a celluloid strip according to the technique of example 17. When placed in an acid solution, the resulting test device had a medium pink color. When placed in an alkaline solution, the resulting test device had a dark pink-violet color.

EXAMPLE 21

A polycarboxylic resin acyl chloride prepared in accordance with the technique of example 1 was reacted with N-(1ethylenediamine in accordance with the procedure of example 20. A 5 g. portion of the resulting product was dispersed in 40 ml. of a pH 5 buffer solution of acetic acid and tris (hydroxymethyl) aminomethane. To this suspension was added with stirring at room temperature 0.1 g. of a suitable diazonium salt. The stirring was continued for 20 minutes and the reaction product was then filtered and washed. The resulting indicator was then incorporated in a celluloid strip according to the technique of example 17. This procedure was repeated for several different diazonium salts. The resulting indicator test devices were then employed to detect pH changes. The following are the characteristics of test devices so produced.

| Diazonium Salt of | pH | Color |
|---|---|---|
| 6-benzamido-4-methoxy-m-toluidine (fast violet, Color Index 37165) | 1 | Blue |
| | 2 | Red |
| Sulfanilic acid | 12 | Violet |
| | 13 | Red |
| o-Dianisidine | 1 | Blue |
| | 2 | Violet |
| p-Amino-N,N-dimethylaniline | 1 | Violet |
| | 2 | Yellow |

EXAMPLE 22

A 2 g. portion of a polystyrene weakly basic ion exchange resin having free amino groups (Amberlite IR-45) was suspended in a mixture of 50 ml. ethanol and 50 ml. water at room temperature. To this were added 100 mg. of dibromothymolsulfonphthalein (bromthymol blue) and the resulting mixture was reacted for 3 hours under reflux conditions. The resulting resin-indicator complex was washed with water and with 0.2 N HCl and 0.2 N NaOH and then dried. A 200 mg. portion of the above product was mixed with 200 mg. cellulose powder, 20 mg. $KH_2PO_4$ buffer, 50 mg. urease, and 4 ml. of a 2 percent solution of ethylcellulose in acetone also containing 0.1 percent polyoxyethylene lauryl ether surfactant (BRIJ). Strips of polystyrene, cellulose acetate and celluloid 5 mm. wide, 60 mm. long and 0.2 mm. thick were treated with the above liquid mixture for a length of 5 mm. and dried. The 5 mm. × 5 mm. test areas of these strips were then immersed for 2–3minutes in different 0.5 ml. liquid serum samples containing various amounts of urea from 20 mg./100 ml. The color of the indicator in the test strip had reproducible differences for different levels of urea and can thus be used to quantitatively measure the urea content of serum.

EXAMPLE 23

A 1 g. portion of the diethylaminoethyl modified form of a polysaccharide dextran suitably cross-linked with epichlorohydrin to produce a hydrophilic solid gel characterized by a high degree of microporosity and containing reactive amino groups (DEAE-Sephadex) was reacted with 0.08 g. of bromthymol blue according to the procedure of example 22. A 200 mg. portion of the resulting indicator complex was mixed with 250 mg. cellulose powder containing 20 weight percent adsorbed urease, 20 mg. of $KH_2PO_4$, and 4 ml. of a 2 percent solution of ethylcellulose in acetone also containing 0.2 percent of a polyoxyalkylene derivative of sorbitan monolaurate (Tween 20). Strips of polystyrene were treated with the above liquid mixture and dried. They were then dipped into a 1 percent solution of ethylcellulose in acetone and dried. The resulting test devices were then immersed for 2 min. in different liquid serum samples containing various amounts of urea from 20 mg./100 ml. to 120 mg./100 ml. The color of the indicator in the test strip had reproducible differences for different levels of urea in the test samples.

The above-described test devices for detection of urea can also be employed to detect urea in blood. The test device is contacted with a blood sample for an appropriate period of time and then the blood is wiped or washed off the test device. The resulting color in the reaction portion of the test device is then compared with a color chart showing the relationship between color and urea content to determine the amount of urea in the blood sample. The water-resistant carrier of the test device acts as a selectively permeable membrane to prevent the red blood cells and interfering proteins of the blood sample from penetrating into the test system and interfering with the color formation.

What is claimed is:

1. A test device for the detection of a component of a fluid system which comprises a transparent organoplastic water resistant carrier selected from the class consisting of cellulose acetate, polystyrene, ethyl cellulose, cellulose nitrate, celluloid, polyvinyl chloride, polyethylene and polymethylmethacrylate containing, as an integral part thereof, a test system selected from the class consisting of an insoluble polymeric diazonium salt of an aromatic polyamine bound through an amide linkage to a cation exchange resin, and an insoluble pH-sensitive reaction product which undergoes a color change with a change in pH, said reaction product being selected from the class consisting of (1) the reaction product between an insoluble polymeric diazonium salt of an aromatic polyamine bound through an amide linkage to a cation exchange resin and a suitable coupling compound, (2) the reaction product between an insoluble diazonium salt of para-aminobenzyl cellulose and a suitable coupling compound, (3) the reaction product between a polycarboxylic resin acyl halide and a compound having at least one free amino or phenolic group, (4) the reaction product between an aromatic diazonium salt and the reaction product between a polycarboxylic resin acyl halide and an aromatic polyamine, and (5) the reaction product between an insoluble polymeric material having free amino groups and a pH sensitive compound which undergoes a color change with a change in pH.

2. A test device according to claim 1, wherein the test system comprises an insoluble polymeric diazonium salt of an aromatic polyamine bound through an amide linkage to a cation exchange resin.

3. A test device according to claim 2 wherein the aromatic polyamine portion of the polymeric diazonium salt is o-dianisidine.

4. A test device according to claim 2 for the detection and/or determination of an enzyme wherein the test system also includes a substrate on which the enzyme can react to liberate a coupling compound which can then react with the insoluble polymeric diazonium salt to product a color change.

5. A test device according to claim 1 wherein the test system is incorporated into at least a surface portion of the organoplastic carrier.

6. A test device according to claim 1 wherein the test system comprises an insoluble PH sensitive reaction product which undergoes a color change with a change in pH, said reaction product being selected from the class consisting of (1) the reaction product between an insoluble polymeric diazonium salt of an aromatic polyamine bound through an amide linkage to a cation exchange resin and a suitable coupling compound, (2) the reaction product between an insoluble diazonium salt of para-aminobenzyl cellulose and a suitable coupling compound, (3) the reaction product between a polycarboxylic resin acyl halide and a compound having at least one free amino or phenolic group, (4) the reaction product between an aromatic diazonium salt and the reaction product between a polycarboxylic resin acyl halide and an aromatic polyamine, and (5) the reaction product between an insoluble polymeric material having free amino groups and a pH sensitive compound which undergoes a color change with a change in pH.

7. A test device according to claim 6 wherein the insoluble pH sensitive reaction product is the reaction product between an insoluble polymeric diazonium salt of an aromatic polyamine bound through an amide linkage to a cation exchange resin and a suitable coupling compound.

8. A test device according to claim 6 for the detection and/or determination of urea in a fluid wherein the test system includes urease and the insoluble pH sensitive reaction product between an insoluble polymeric material having free amino groups and a pH sensitive compound which undergoes a color change in pH.

* * * * *